United States Patent [19]

Eggebeen

[11] Patent Number: 4,979,051
[45] Date of Patent: Dec. 18, 1990

[54] BIMODAL MULTI-TRACK MAGNETIC HEAD

[76] Inventor: James A. Eggebeen, 11323 Vela Dr., San Diego, Calif. 92126

[21] Appl. No.: 171,842

[22] Filed: Mar. 22, 1988

[51] Int. Cl.[5] .......................... G11B 5/02; G11B 5/265
[52] U.S. Cl. ...................................... 360/21; 360/121
[58] Field of Search ................................... 360/18–21, 360/121

[56] References Cited

U.S. PATENT DOCUMENTS

| 2,712,572 | 7/1955 | Roberts . |
| 3,164,682 | 1/1965 | Anderson . |
| 3,219,353 | 11/1965 | Prentky . |
| 3,328,195 | 6/1967 | May . |
| 3,402,463 | 9/1968 | Bos et al. . |
| 3,404,392 | 10/1968 | Sordello . |
| 3,512,253 | 5/1970 | Perkins et al. . |
| 3,665,118 | 5/1972 | Cooper, Jr. . |
| 3,692,255 | 9/1972 | Von Behren . |
| 3,718,776 | 2/1973 | Bate et al. . |
| 3,790,754 | 2/1974 | Black et al. . |
| 3,813,693 | 5/1974 | Gooch et al. . |
| 3,861,619 | 1/1975 | Wolff . |
| 3,956,769 | 5/1976 | Beecroft et al. . |
| 3,986,205 | 10/1976 | Fayling . |
| 4,075,384 | 2/1978 | Suzuki et al. . |
| 4,110,799 | 8/1978 | Bergmans et al. . |
| 4,149,198 | 4/1979 | Behr et al. . |
| 4,158,213 | 6/1979 | Griffith . |
| 4,221,348 | 9/1980 | Moeller . |
| 4,237,189 | 12/1980 | Deffeyes . |
| 4,287,540 | 9/1981 | Cheatham ............................ 360/18 |
| 4,291,354 | 9/1981 | Chase . |
| 4,313,140 | 1/1982 | Keidl . |
| 4,314,289 | 2/1982 | Haynes . |
| 4,318,141 | 3/1982 | Haynes . |
| 4,322,764 | 3/1982 | Tanaka ............................ 360/121 X |
| 4,334,252 | 6/1982 | Toriu . |
| 4,347,534 | 8/1982 | Kimura . |
| 4,390,911 | 6/1983 | Klaassen . |
| 4,393,427 | 7/1983 | Sakurai . |
| 4,439,699 | 3/1984 | Brende et al. . |
| 4,456,934 | 6/1984 | Wedman et al. . |
| 4,466,564 | 8/1984 | Smith et al. . |
| 4,523,727 | 6/1985 | Morioka . |
| 4,534,523 | 8/1985 | Zarr . |
| 4,539,615 | 9/1985 | Arai et al. . |
| 4,571,789 | 2/1986 | Morioka . |
| 4,581,663 | 4/1986 | Tanaka . |
| 4,609,959 | 9/1986 | Rudi . |
| 4,620,253 | 10/1986 | Garwin et al. . |
| 4,695,909 | 9/1987 | Momata ........................ 360/121 X |

Primary Examiner—A. J. Heinz

[57] ABSTRACT

A magnetic head, and method of its construction, for placing multiple, high tolerance servo information tracks in evenly spaced configuration across the width of a magnetic medium in a single pass of the magnetic head over the medium. The head comprises a monitoring fixture which secures a full-width write transducer, in tandem with a multiple-track write transducer. Preferably, the transducers are angularly skewed with respect to the travel direction of the magnetic medium, but are substantially parallel to each other. In operation, the magnetic medium first passes adjacent the full-width write transducer which writes a servo pattern across the width of the magnetic medium at a first frequency. The magnetic medium next passes adjacent the multiple-track write transducer which writes servo information onto multiple tracks in the magnetic medium at a second frequency.

A method for constructing the magnetic head is disclosed, including the method of constructing the multiple track write transducer, and the method of determining the desired angular orientation of the transducers as they are affixed in the housing with respect to travel direction of the magnetic medium.

28 Claims, 3 Drawing Sheets

BIMODAL MULTI-TRACK MAGNETIC HEAD

BACKGROUND OF THE INVENTION

1. Field of and the Invention

The present invention relates to magnetic read write heads, and in particular to a magnetic head for writing a plurality of evenly spaced, high tolerance servo information tracks on the full width of a magnetic medium, such as a magnetic tape, in a single pass. The invention also relates to a process for making such magnetic heads.

2. The Prior Art

It has long been an important objective of designers in the magnetic storage technology to provide magnetic media having data stored thereon in high track densities with high lineal densities. In seeking this objective, it has been recognized that higher density recording can be more easily achieved if a servo signal, such as a track location indicating signal, is superposed on the magnetic media with the data signal. One system for accomplishing this utilizes a magnetic medium comprising a dual layer magnetic coating on a support surface. The lower of the two magnetic layers has a higher retentivity and coercivity than the upper magnetic layer.

Servo signals are first written in the lower layer to form parallel, adjacent servo tracks. Servo signals are written in adjacent servo tracks at different frequencies. Data signals are subsequently written in the upper layer along data tracks that are defined through reference to the servo information in the lower layer. For example, each data track may be defined as being superimposed over ½ of an odd numbered servo track and ½ of an even numbered servo track. By providing a magnetic medium wherein the lower servo level has a higher coercivity than the upper data level, the servo signals are allowed to remain undisturbed by subsequent writing and rewriting of data signals of lower magnetic field strength in the upper layer.

Such a track-following servo system permits accurate alignment of the data transducer or data read and write head with a recording track. The positioning is accomplished by simultaneously reading a data track and the servo tracks on either side thereof, and then filtering the data from the servo information. The amplitude of the high frequency and lower frequency servo information from adjacent servo tracks is then compared to develop a position error signal that indicates whether the servo read head is correctly positioned between the two servo tracks, or whether it is located more above one of the tracks than the other. The error signal is then supplied to an actuator, which responds by adjusting the position of the data transducer.

The prior applications of this technology have typically been in connection with magnetic media comprising magnetic disks. A significant problem has been encountered in attempting to place these types of parallel servo tracks on magnetic disk media. This problem comprises the technological difficulty of maintaining the linear density of the servo information in the track as the track progresses toward the center of the disk. For example, at a constant rotation rate of the magnetic disk, the velocity of a track close to the center of the disk is much slower than the velocity of a track close to the outside edge of the disk. Accordingly, writing information onto the disk at a constant writing rate will produce a linear density of information that increases in density as the proximity of the track to the center of the disk increases.

Two primary options are available for maintaining a constant linear density on the various tracks of a disk. In the first option, if the rotational speed of the disk is held constant, the frequency of the servo information being written onto the disk must be decreased as the distance from the track to the center of the disk decreases. In the second option, if the frequency of the servo information is held constant, then the rotational speed of the disk must be increased as the distance from the track to the center of the disk decreases. Of course, a third option would be to provide a combination of increasing the speed of the disk, as well as reducing the frequency of the servo data as the track distance from the disk center decreases.

Because of the above-identified problems, it has been necessary in prior art systems to write the servo data tracks into the magnetic media one track at a time. This process is time consuming, and suffers from a relatively high degree of inaccuracy in positioning the servo tracks in consistently close proximity to one another. For example, after a first servo track is written onto the magnetic media, the position of the servo writing head is adjusted to place the next track adjacent to the first track. It is very difficult to accomplish this mechanical adjustment of the head to provide a very high accuracy in the track alignment. It is even more difficult to maintain this alignment throughout the entire trip around the magnetic disk, due to factors such as mechanical play, discontinuities in the disk surface, and changes in physical properties of the disk caused by changing environmental conditions, such as changes in temperature.

Many of the problems associated with use of magnetic disks can be overcome through the use of a magnetic tape as the recording medium. For example, since the tape speed past a stationary head is constant across the entire width of the tape, a multi-track write head could be utilized to write servo tracks onto the tape. This would accomplish the accurate alignment of the tracks with respect to one another since they would be simultaneously written by the fixed writing gaps of the multi-track head. Magnetic tapes that have substantially consistent levels of coercivity are well-known and commonly used in data storage and handling applications. The use of two data storage layers for recording signals has been described for application in magnetic tapes in references such as U.S. Pat. Nos. 3,328,195 to May, and 4,075,384 to Suzuki et al., each of these references being incorporated herein by reference. Multiple track heads are also known in the art. Nevertheless, an accurate and efficient system and method for writing the servo information onto such a magnetic recording medium in a single pass of the writing head has not been described in the prior art.

Another problem experienced in prior art systems has involved separating the servo information from the other data detected by a conventional read head. For example, when a read head is used with a multi-layer magnetic medium having both the servo information and the data simultaneously detected by the read head, a scheme must be provided for separating the servo information from the data. This separation is generally accomplished by application of filtering techniques. These techniques typically require circuitry dedicated specifically for this separation function, increasing the cost and complexity of the read systems. Although it would be very desirable, the prior art has not described a system and method for writing the servo information onto the magnetic medium in a single pass, as described above, and in an orientation such that properly oriented read heads may subsequently read either the servo information or the data only.

In view of the above, it would be an important improvement in the technology to provide an apparatus and method for writing a plurality of servo tracks onto a magnetic medium with a high degree of accuracy to enable subsequent track following systems to write signals on the magnetic medium with high track densities and with high lineal densities. It would be a further improvement in the technology to provide such a system and method that would accomplish this writing step in a single pass of the magnetic medium under the write head. It would be a still further improvement to provide such a system and method that would write the servo information onto the magnetic medium at an orientation such that properly oriented read heads may subsequently read either the servo information or the data only. It would also be an important improvement in the technology to define a low cost and efficient method for manufacturing such a servo writing system.

BRIEF SUMMARY OF THE INVENTION

The present invention comprises a magnetic head and method of its construction, wherein a plurality of evenly spaced, high tolerance servo information tracks can be placed on the full width of a magnetic medium, such as magnetic tape, in one single pass of the magnetic head over the magnetic medium. The head comprises a housing or mounting fixture upon which a full-width, write core or transducer is affixed in tandem with a multiple-track, write core or transducer. In one preferred embodiment, both of these transducers are oriented at an angle such as, for example, 45 degrees with respect to the direction of motion of the magnetic medium so that a data head for subsequently reading and writing data on the magnetic medium can be oriented at a different angle, permitting detection of the data recorded on the magnetic medium without detection of the servo information.

In operation, the magnetic medium first passes adjacent the gap of a full-width, write transducer of the magnetic head. This full-width, write transducer is energized with a sinusoidal write current which, optionally, may be AC-biased, to fully saturate the magnetic medium with a linear sinusoidal wave form. Accordingly, once the magnetic medium has passed adjacent the full-width, write transducer, a servo pattern at a first frequency has been written across the entire width of the magnetic medium. The magnetic medium next passes adjacent the gap of a multiple-track, write transducer, which is energized with an AC-biased sinusoidal write current at a second frequency. The second frequency is different from the first frequency, and the write current is biased at a strength so as not to erase the information in the magnetic medium adjacent the cutaway non-writing sections of the multiple track transducer.

After the magnetic medium has passed in proximity to the gap of both of the write transducers in the magnetic head, the magnetic medium contains a plurality of servo information tracks. The servo information is at different frequencies in adjacent tracks, which tracks were placed across the width of the magnetic medium in one single pass of the magnetic medium adjacent the magnetic head.

The invention finds particular application when used in conjunction with a magnetic medium having a plurality of coercivity levels so that the servo information may be properly placed in an underlying, high coercivity layer, permitting data or other information to later be placed in an overlying lower coercivity layer without modifying the servo information in the high coercivity layer.

The magnetic head is constructed by providing a housing or mounting fixture upon which is secured a transducer forming a full width write bar of the type typically used for recording on magnetic tape. A transducer forming a multi-track write bar is also secured within the housing or mounting fixture, in tandem to the full-width, write bar.

The multi-track, write transducer is constructed by assembling a D-bar composed of a material of low magnetic permeability, such as a hard ferrite, with an L-bar of a magnetic head. This transducer is initially formed by a conventional construction technique corresponding to that for making full-width, write transducers, such as the one described above. Accordingly, the transducer is initially assembled to form what is essentially a full-width, write transducer. Following this, the writing surface or face is milled away, or photolithographically etched away, to leave a pattern defining alternating contact and non-contact bands on the face of the transducer. This milling or etching technique may be accomplished with a precision mill, a chemical etching technique, or an ion beam milling technique. The non-contact bands define cutaways having a depth such that under saturation field levels from the head, the spacing loss underneath the etched-away sections is sufficient to reduce the magnetic flux field strength to a level below the switching field distribution of the lowest coercivity particles in the servo layer of the magnetic medium, in this case, the underlying high coercivity servo layer. Accordingly, a signal may be provided having a magnetic field strength sufficient to write information into the magnetic medium through the contact bands while not being strong enough to write into or affect information in the magnetic medium adjacent to the non-contact head bands.

The cutaway areas or gaps in the heads are filled with a non-magnetic glass or ceramic material to a depth which is equal to the front face of the head. The head is then polished to give a uniform media contact surface across the face of the head.

In the embodiment wherein the transducers are placed at an angle of approximately 45 degrees to the direction of motion of the magnetic media, the actual cutting of the gaps or noncontact bands defines a channel cut about 45 degrees normal to the gap center line. This multiple track transducer is then affixed on the housing or mounting fixture in tandem to the full width write transducer.

These and other advantages and features of the present invention will become more fully apparent from the following description and appended claims taken in conjunction with the accompanying drawings.

DETAILED DESCRIPTION OF THE PREFERRED EMBODIMENT

Figure 1:
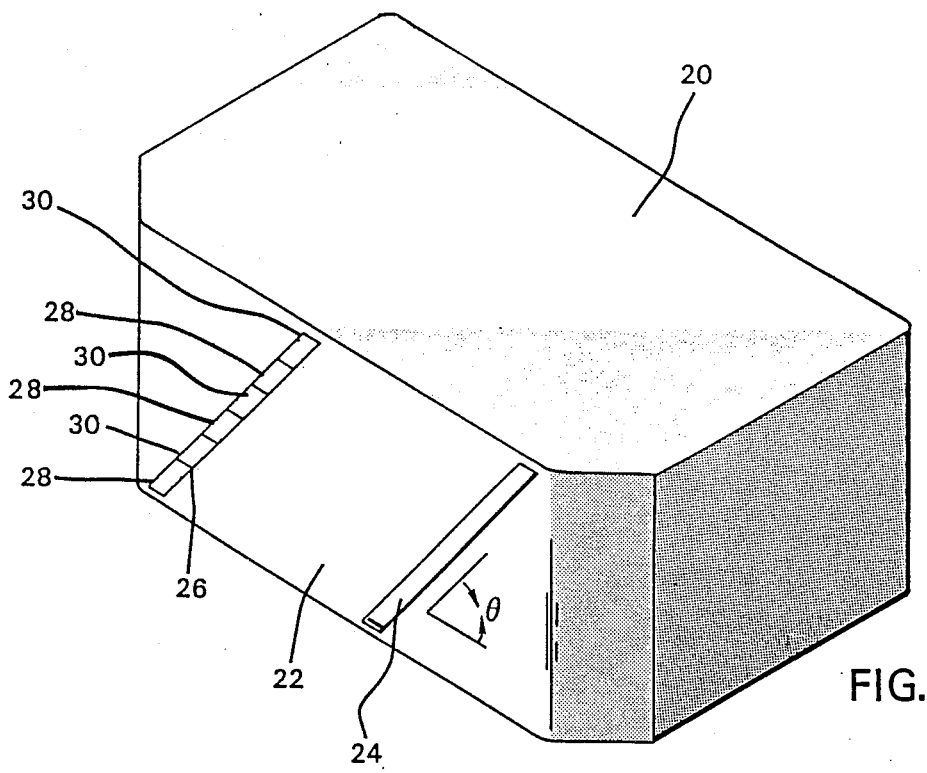
FIG. 1 is a perspective view of the writing face for a magnetic head of the present invention, illustrating the configuration of the write transducers thereon.

The invention is best understood by reference to the figures wherein like parts are designated with like reference numerals throughout.

One presently preferred embodiment of the bimodal, multi-track magnetic head of the present invention is illustrated in FIG. 1. Specifically, the magnetic head of FIG. 1 includes a housing 20, which is preferably comprised of a non-magnetic material, such as brass or ceramic, and configured in the form of a block having one or more interior cavities for securing magnetic write cores or transducers. The housing 20 includes a write face 22, which preferably defines a slightly curved configuration (not shown) to accommodate the passage of a magnetic medium in close proximity thereto.

Positioned in face 22 so as to be adjacent the surface of the magnetic medium during operation of the present invention, is a full-width write bar 24, comprising a full width gap that is formed by a first transducer (not shown) secured in position within a cavity (not shown) in the housing 20. The first transducer comprises at least a portion of a full-width, write head, of the type that is well-known in the technology. One such full-width, write head that could be utilized in the present invention is designated as part number 410523, manufactured by U.S. Magnetics of Lawndale, Calif., U.S.A. In the preferred embodiment, this full-width, write head places a long wavelength pattern on the full or entire width of a magnetic medium such as a magnetic tape (not shown in FIG. 1).

Also extending from the write face 22 of the housing 20, so as to be adjacent to the magnetic medium during operation, is a multiple-track, write bar 26, which is located in tandem alignment with the full-width write bar 24 along the length of the write face 22. The multiple-track write bar 26 comprises a plurality of contact points 28 (shown most clearly in FIG. 6), which are separated by gaps or noncontact points 30. The contact points 28 are formed on the writing face of a second write transducer to provide a multiple track write head that is secured within the first cavity of the housing 20 or within a separate cavity (not shown) in the housing 20.

In a preferred embodiment, the full-width, write bar 24 and the multiple track write bar 26 are each oriented at an angle $\theta$ with respect to the edges of the write face 22. The angle $\theta$ of orientation of the write bars 24 and 26 is selected by a method to be described hereinafter. The angle $\theta$ is selected so that servo information written by the write bars 24 and 26 onto a magnetic medium at the selected angle can subsequently be read by an appropriately oriented read head, with minimal interference from other data or information written onto the magnetic medium by write bars of other selected angles of orientation.

The contact points 28 write the servo information onto the magnetic medium in such a manner as to define the multiple tracks within the medium. More specifically, by reference to FIG. 2, it may be seen that the device of the present invention is operated by placing the housing 20 adjacent a magnetic medium 32, such as a magnetic tape, so that the write bars 24 and 26 are positioned in proximity to the magnetic medium 32. As the magnetic medium 32 passes in the direction indicated by arrow 34, portions thereof first pass in proximity to the full-width write bar 24. The full-width write bar 24 is utilized to write a first servo information pattern such as that depicted at 36 onto the magnetic medium at a first selected frequency. This writing process is accomplished through use of well-known, conventional techniques for writing information onto magnetic media via a write head. A representation of the first servo pattern 36 present in the tape 32 after passing in proximity to the full-width write bar 24 may be seen by reference to FIG. 3, which comprises a cross-sectional view of the magnetic medium taken along lines 3—3 of FIG. 2. Upon viewing FIG. 3 it becomes readily apparent that the servo signal pattern 36 at the selected frequency has been continuously placed across the entire width of the magnetic medium 32.

Figure 2:
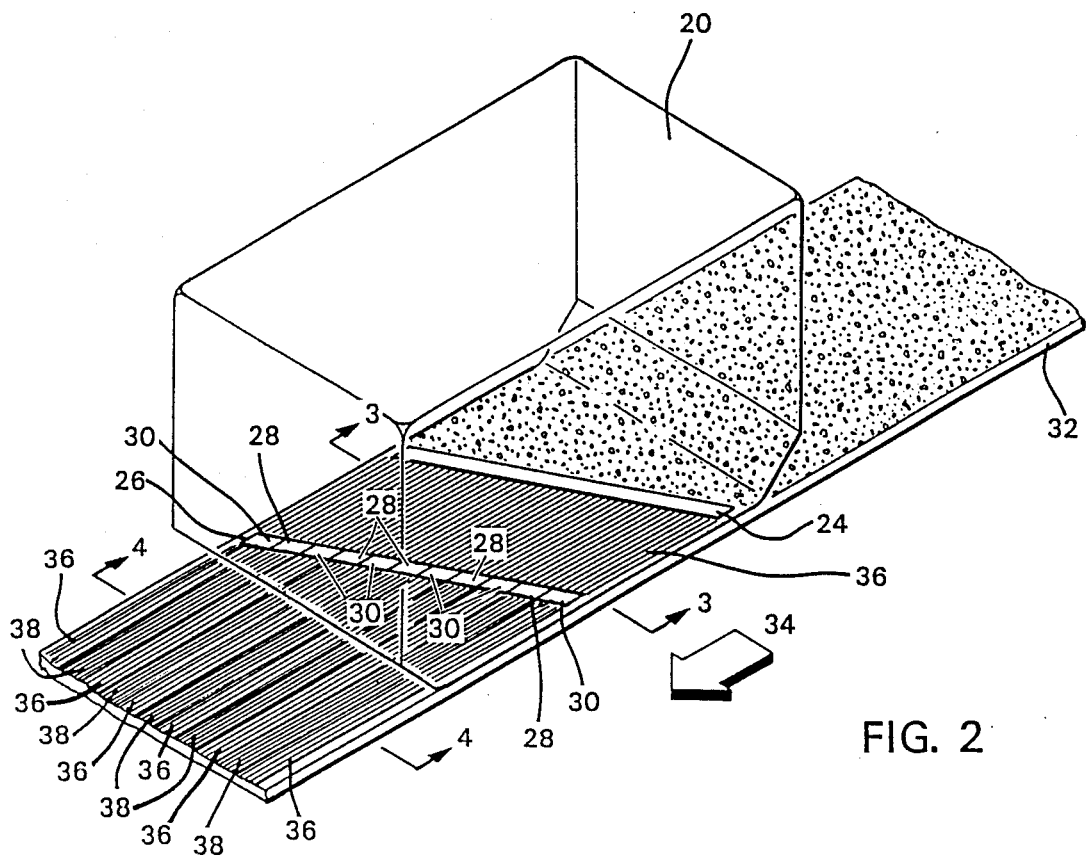
FIG. 2 is a transparent perspective view of the magnetic head of the present invention, illustrating the orientation of the write transducers therein, and the magnetic pattern produced, with respect to an adjacent magnetic medium during use.
Figure 3:
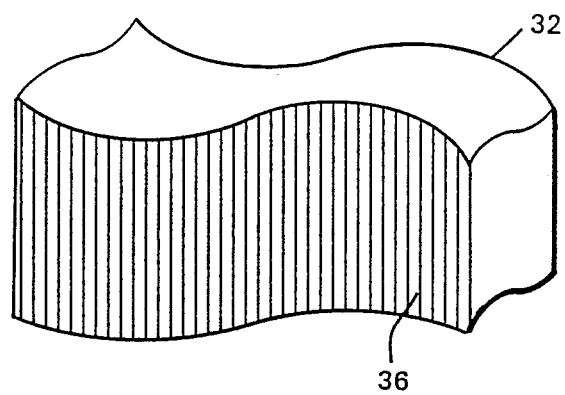
FIG. 3 is a partial, cross-sectional view of the magnetic medium, taken along lines 3—3 of FIG. 2.
Figure 4:
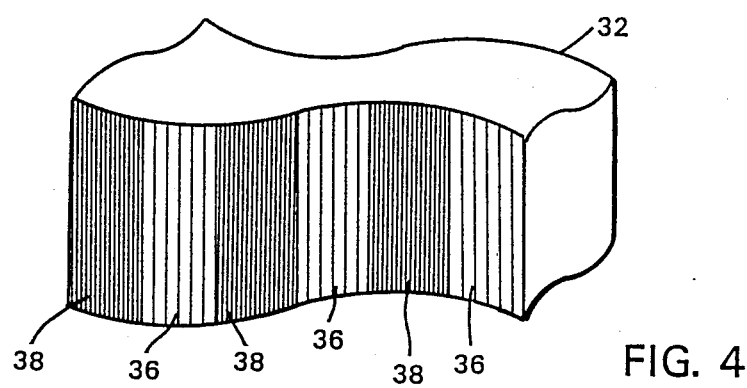
FIG. 4 is a partial, cross-sectional view of the magnetic medium taken along lines 4—4 of FIG. 2.

After the magnetic medium 32 has passed in proximity to the full-width write bar 24, it continues to progress in the direction of arrow 34 and passes in proximity to the multiple-track write bar 26. The write bar 26 is energized by use of conventional writing techniques so as to place a servo information pattern at a second selected frequency in those portions of the magnetic medium 32 that are in proximity to the contact points 28. FIG. 4 illustrates a cross-sectional view of the magnetic medium 32 taken along lines 4—4 of FIG. 2, showing the second frequency servo information pattern 38 written into selected locations in the magnetic medium 32 via contact points 28, so as to define tracks at the second frequency that alternate with tracks designated by the first frequency servo information pattern 36.

The multi-track configuration illustrated in FIG. 4 is of a type which can find application in any of a number of systems, such as the one described in U.S. Pat. No. 3,404,392 to Sordello entitled "Magnetic Track Following Servo System," which patent is hereby incorporated herein by reference. The Sordello patent publication describes parallel tracks having servo information of different frequencies, but does not teach how this information is written within the magnetic media. The Sordello publication also describes the use of a magnetic medium having magnetic layers of different coercivity. Magnetic media having different coercivities and that are applicable for use on magnetic tape, are disclosed, along with their method of manufacture, in U.S. Pat. No. 4,237,189 to Deffeyes entitled "Polymodal Magnetic Recording Media Process Of Making and Verifying the Same and Compositions Useful Therein;" and in U.S. Pat. No. 4,281,043 to Deffeyes entitled "Polymodal Magnetic Recording Media and Compositions Useful Therein." Both of these Deffeyes patent publications are hereby incorporated herein by reference.

The magnetic head of the present invention provides a means whereby the multiple track servo information may be placed in the magnetic medium very accurately and efficiently in a single pass of the magnetic medium in proximity to the magnetic head. One preferred system that incorporates the use of the invention described and claimed herein, comprises a system and method for writing and reading data onto a magnetic medium having at least two magnetic levels of different coercivity, with multiple tracks of servo information recorded at alternating frequencies. This system and method is described in applicant's co-pending patent application Ser. No. 171,755 entitled "RECORDING SYSTEM HAVING HEAD TRANSDUCERS WITH CONTROLLED SKEW," which application is being filed concurrently herewith. This co-pending patent application is hereby incorporated herein by reference.

Although the embodiment described herein discloses the transducers forming the full-width write bar 24 and the multiple-track write bar 26 as being secured within a common housing 20, it will be appreciated by those skilled in the technology that those transducers can be secured separately in different housings or on other mounting fixtures that are connected so as to maintain the full-width write bar 24 and the multiple-track write bar 26 in tandem alignment with respect to the direction of motion of the adjacent magnetic medium 32.

Figure 5:
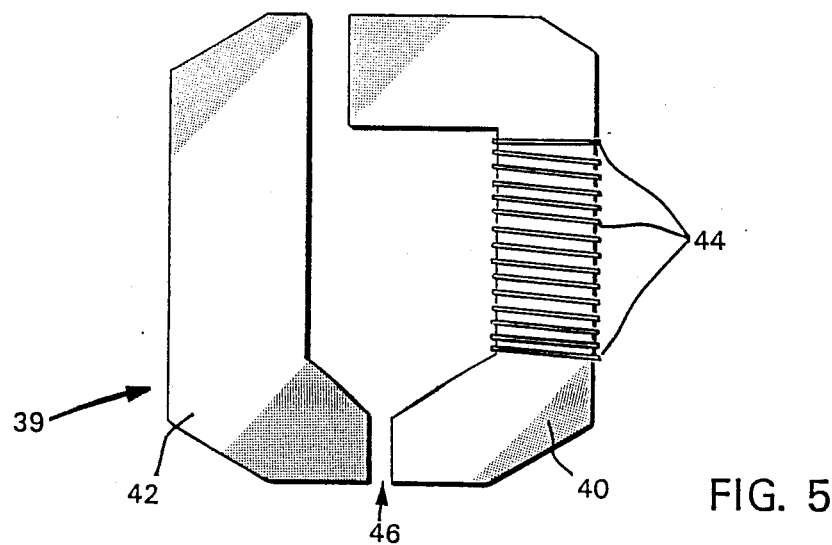
FIG. 5 is a side elevation view of the multi-track transducer portion of the magnetic head of the present invention.

The physical configuration and method of manufacture of the magnetic head of the present invention can best be described by reference to FIGS. 5-7. In particular, FIG. 5 illustrates a side elevational view of a magnetic transducer structure generally indicated at 39, which can form either the full-width write bar 24 or the multiple-track write bar 26. This transducer structure 39 includes a conventional D-bar 40 that is composed of a hard ferrite or similar material of low magnetic permeability, and an L-bar 42 also constructed of similar materials. A plurality of coils 44 are illustrated as being wound about the D-bar 40. Of course, it will be appreciated by those skilled in the technology that the coils 40 could alternatively be wound about the L-bar 42 with substantially no change in the performance of the magnetic transducer 39.

The magnetic transducer 39 is formed into a write head by establishing a gap 46 between the lower extended portions of the D-bar 40 and the L-bar 42. The length of the gap 46 is determined based upon factors including the packing density, the bit length, and the required resolution. For example, with an established speed between the head and the magnetic medium, the resulting packing density (BPI) in bits per inch, and bit length (BL) can be calculated as:

$$BPI = 2 * f_u / \text{speed (in inches per second)} \quad (1)$$

where $f_u$ is the upper operating frequency, which is dictated by the data rate (DR) and encoding technique. For example, when using conventional FM encoding, $$f_u = DR \quad (2)$$

when using conventional MFM encoding, $$f_u = 0.5 * DR \quad (3)$$

The bit length (BL) for conventional applications is calculated as:

$$BL = 1,000,000 / BPI \text{ microinches} \quad (4)$$

Having determined the above information, the gap length (Lfg) to be set is selected as:

$$Lfg = 0.6 * BL \text{ for high resolution}$$

$$Lfg = 0.9 * BL \text{ for high output} \quad (5)$$

These values may be refined further to correct for specific conditions. After establishing the gap 46, the D-bar 40 and the L-bar 42 are solidly bonded together by conventional bonding means. This process corresponds to well-known construction techniques for forming a full width write bar, such as those typically used for recording on magnetic media, including magnetic tape.

The method of manufacturing the magnetic transducer that defines the multiple-track write bar 26 can best be described by reference to FIG. 6. The configuration of the multi-track magnetic transducer 48 illustrated in FIG. 6 initially corresponds to the full-width write transducer 39, the manufacture of which was previously described in connection with FIG. 5. Thus, with the full-width write transducer assembled, the surface or write face 22 is milled or otherwise modified to create a pattern comprising the alternating sequence of the contact bands 28 and the noncontact bands 30.

Figure 7:
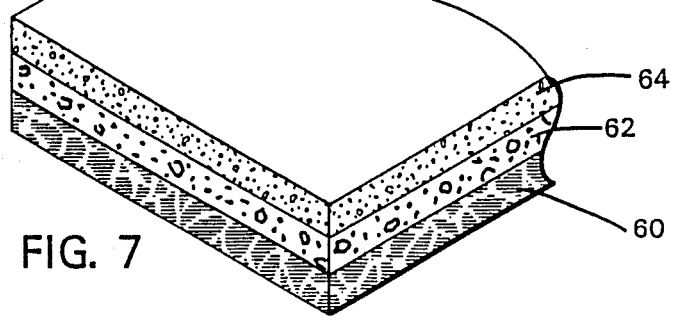
FIG. 7 is a partial schematic view of a magnetic medium having two magnetic layers of differing coercivity.

To assist in describing the method for determining the depth of the cutaway sections defining the noncontact bands 30, reference is made to FIG. 7, which illustrates one preferred embodiment of a magnetic media 59 that may be used in conjunction with the head. Specifically, this magnetic medium includes a support layer or base film 60 upon which is positioned a lower level magnetic medium 62 comprised of a substance including magnetic particles having a high level of coercivity. Upon the lower level magnetic medium 62 is positioned an upper level magnetic medium 64 comprising a material containing magnetic particles having a lower level of coercivity than those in the lower level magnetic medium 62.

Figure 6:
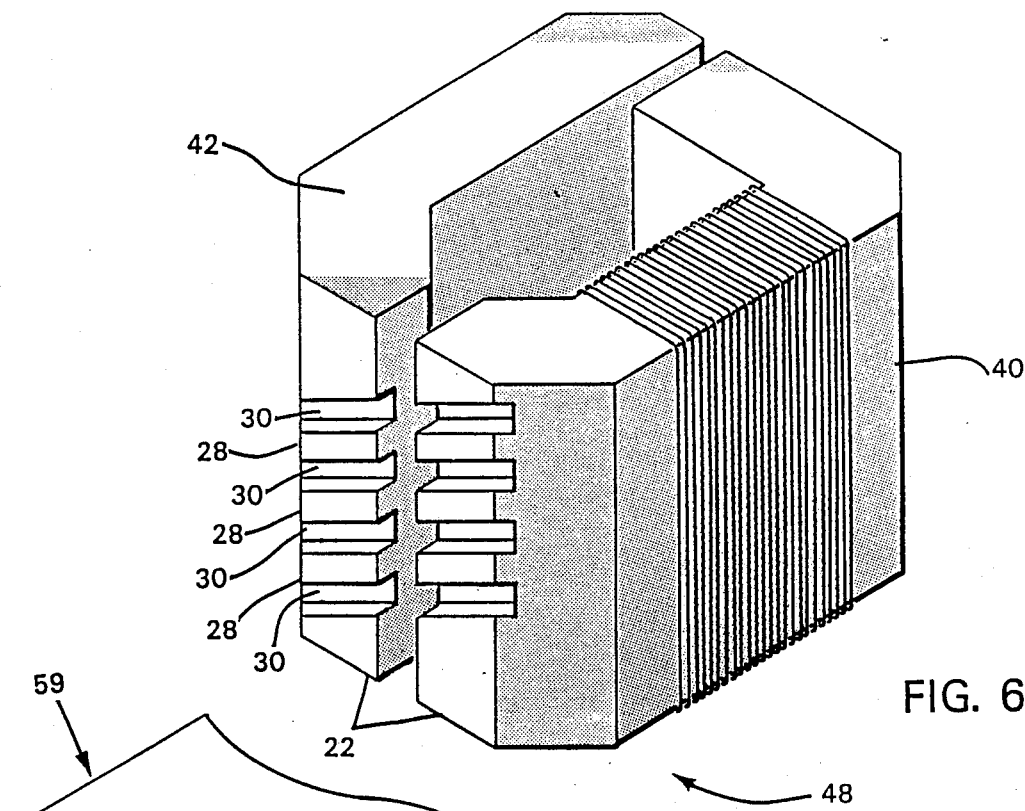
FIG. 6 is a perspective view showing the multiple track writing surface for the multi-track transducer portion of the magnetic head of the present invention.

The depth of the cut that forms the noncontact bands 30 of FIG. 6 is such that under saturation field levels from the head, the spacing loss between the noncontact band 30 and the adjacent magnetic medium 59 is sufficient to reduce the magnetic flux field strength to below the switching field distribution of the lowest coercivity particles in the magnetic medium 59 passing in proximity to the write face 22. For example, if the multi-track transducer 48 were positioned in a write configuration with its contact bands 28 adjacent the upper surface of the magnetic medium 59 of FIG. 7, the depth of the cutaway section forming the noncontact bands 30 must be at least equal to the thickness of the lower level 62, which is typically 40 to 80 microinches, plus approximately three times the coating thickness of the upper level 64. This condition is developed in order to reduce the field strength safely below the switching field distribution limit of the high coercivity particles in the lower level 62 of the magnetic medium 59.

One example of a calculation for determining this cutaway section is now set forth. The calculation is based on an assumption that there exists a 180% saturation magnetization level field strength produced by the magnetic head at the point where the high coercivity particles in the lower level 62 lie against the base 60 of the magnetic medium 59.

In the normal recording mode, with the contact bands 28 in very close proximity or in actual contact with the upper surface of the upper level magnetic medium 64, the field radius in question is equal to the thickness of the lower level magnetic medium 62 added to the thickness of the upper level magnetic medium 64. If it is assumed that the worst case situation is that the upper medium 64 is 80 microinches thick, and that the lower medium 62 is also 80 microinches thick, the field radius from the contact bands 28 of the transducer 48 to the most distant high coercivity particles is 160 microinches. Based on the initial assumption mentioned above, it is at this contact point between the lower level 62 and the base 60 that the field strength must be equal to 180% of the saturation magnetization requirements.

If it is assumed that the coercivity of the particles in the lower level magnetic medium 62 is 600 oersteds, the particle field strength at the write face 22, where the contact bands 28 are in proximity to the upper surface of the upper medium 64, must be at least 600 oersteds $\times 180\% = 1080$ oersteds in order to write in the entire thickness of the lower level magnetic medium 62. In order to avoid affecting any of the particles in the lower level medium 68 beneath the noncontact bands 30, it is necessary that the depth of those bands 30, be such that they produce a field strength of about 500 oersteds or less at the interface between the lower and upper level magnetic media 67 and 64, respectively.

When a write head is not in contact with the surface of a magnetic medium, the field strength of the write head is known to decrease at the rate of $$55\Delta/\lambda\delta B \qquad (6)$$

where $\Delta$ = separation distance between the write head and the surface of the magnetic medium; and
$\lambda$ = wavelength of the signal being recorded.

For purposes of this example, it will be assumed that the value of the wavelength $\lambda$ will be a commonly accepted worst case value of 800 microinches (1.25 thousand ftpi). With the field strength at the surface of the noncontact bands 30 corresponding to 1080 oersteds, as calculated above, the total field strength decrease to achieve 500 oersteds at the interface between the lower and upper level magnetic media must be equal to 1080/500 = 2.16 times, or 3.34 dB. Solving equation (6) above for this 3.34 dB spacing loss, with the 800 microinch wavelength provides the following relationship:

$$
\begin{aligned}
3.34 \text{ dB} &= 55 \Delta/800 \text{ microinches dB} \\
55 \Delta &= (3.34)(800 \text{ microinches}) \\
\Delta &= \frac{(3.34)(800 \text{ microinches})}{55} \\
\Delta &= 48 \text{ microinches}
\end{aligned}
\qquad (7)
$$

Accordingly, the distance separation from the surface of the noncontact band 30 to achieve a field strength of 500 oersteds at the interface between the lower level magnetic medium 62 and the base 60 is 48 microinches. However, it is desired that the 500 oersted field strength level occur at the interface between the lower level magnetic medium 62 and the upper level magnetic medium 60. Since the thickness of the lower level magnetic medium 62 is 80 microinches, it is necessary to add an additional 80 microinches between the surface of the noncontact band 30 and the upper surface of the upper level magnetic medium 64. Thus, the total space between the surface of noncontact band 30 and the surface of upper level magnetic medium 64 is 80 microinches + 48 microinches for a total of 128 microinches. This spacing distance comprises the depth of the cut in the surface of transducer 48 necessary to produce the desired 500 oersted field strength at the interface between the lower and upper level magnetic media 62 and 64, respectively.

With the cutaway depth of the noncontact bands corresponding to the amount indicated above, a field strength of below 500 oersteds will exist at the boundary of the upper medium 64 and the lower medium 62. This field strength is low enough that the switching field distribution of the 600 oersted particles is almost completely unaffected by the write signal.

Having determined the depth of cut necessary to define the noncontact bands 30, a precision milling operation is preferably implemented to accomplish the cuts. The precision milling technique corresponds to the milling techniques conventionally used in the technology for precisely milling away surfaces such as those defined on the write face 22 of the magnetic head. An alternate method of removing the material could be a photolithography technique which is also similar to that used in the manufacture of semiconductors. Specifically, the contact pattern to be present on the write face 22 is designed on a large scale high magnification drawing, which is then photographically reduced to match the physical size of the write face 22 portion of the magnetic head. Due to this conventional photo-reduction technique, the tolerance error in the original drawing is decreased by the reduction factor. This permits a very high degree of accuracy to be maintained in the placement of the cores.

With the milling or etching process complete, the transducer 38 defining the full width write bar 24 and the transducer 48 defining the multiple track write bar 26 are each placed within the cavity of the housing 20 (or separate cavities) so as to secure them into their desired positions. The open portions of the housing 20 are then bonded together by a process such as lamination using epoxy to permanently affix the cores in their respective positions.

In one preferred embodiment of the servo information head of the present invention, the transducers 38 and 48 defining the full-width write bar 24 and the multiple-track write bar 26, respectively, are secured in the housing 20 at the angle $\theta$ with respect to the motion of the magnetic medium past the write bars. This angular orientation is illustrated, for example, in FIG. 1 where it is seen that both of the write bars 24 and 26 are angularly oriented on the face 22 of the housing 20. This angular orientation permits servo information to be written in a high coercivity layer of a magnetic medium having multiple layers of different coercivity, and data to be written onto or read from a lower coercivity layer in that magnetic medium by a read or write head that is oriented at another selected angle with respect to the direction of travel of the magnetic medium. With the proper angular displacement between the servo information and the other data, a read head can read the data or the servo information depending upon its angular orientation, without any substantial interference from the signals that were placed in the medium at the other angular orientation.

Referring again to FIG. 6, it is noted that the contact bands 28 and noncontact bands 30 are angularly oriented with respect to the sides of the transducer 48. This angular orientation permits the transducer 48 to be secured within the housing 20 at the appropriate angle, while the bands 28 and 30 are oriented in parallel alignment to the direction of travel of the magnetic medium. Accordingly, the angular orientation of the pattern written onto the magnetic medium via the multiple track write bar 26 is maintained while the track pattern produced on the magnetic medium is defined by the relationship of the contact and noncontact bands, 28 and 30.

Figure 8:
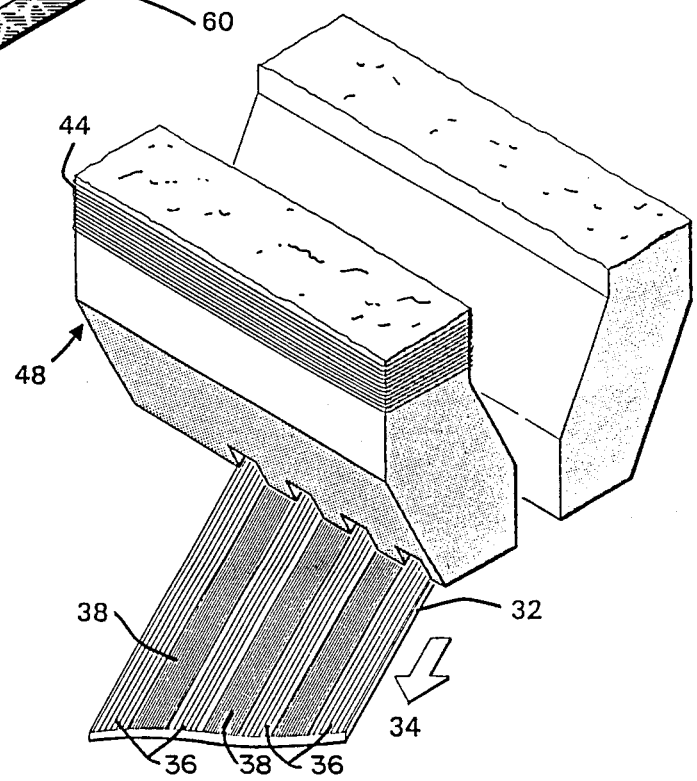
FIG. 8 is a partial perspective view of the multi-track transducer portion of the magnetic head of the present invention, depicting the writing of servo information onto a magnetic medium.

The angular relationship of the multiple track transducer 48 with respect to the magnetic medium 32 is illustrated in FIG. 8. (For purposes of illustration, the angular orientation of the contact bands 28 and the noncontact bands 30 with respect to the sides of the transducer 48 has been changed from that orientation illustrated in FIG. 6). It is also seen from FIG. 8 that the tracks corresponding to the first frequency servo information pattern 36 and the second frequency servo information pattern 38 correspond to the configuration of the contact and noncontact bands 28 and 30 that are oriented on the transducer 48 so as to be in parallel orientation with respect to the direction of travel of the magnetic medium 32 as indicated by the arrow 34.

In order to determine the appropriate angle of displacement for the write bars 24 and 26 in the housing 20, the wavelength relationship of the servo information to the data applied by another head must be considered, as well as the widths of the tracks defined in the magnetic medium 32. In order to have a complete nulling of the signals so that a properly oriented read head will detect only one of either the servo information or the data, the azimuthal misalignment between the signals must be such that one full wavelength of one of the signals is underneath the write bar or gap of the read head at a given time.

The procedure for determining the appropriate angle of displacement of the write bars 24 and 26 is defined below by use of one exemplary situation. The calculations in this example situation are based on the assumption that the magnetic medium 32 comprises two layers of magnetic material having different levels of coercivity, such as the magnetic medium 59 of FIG. 7. It will be assumed that the servo information density is approximately one-fourth as great as the data density. This relationship defines the longest wavelength component that will be used in determining the angle of displacement. The possibilities for the azimuthal misalignment are therefore equal to the arc tangent of the integral multiples of the recording density divided by the track width of the head that is reading the information (the read head). This is mathematically defined as follows:

$$\text{Azimuthal Misalignment} = \text{Tan}^{-1}(N[2/\text{ftpi}]/TW) \quad (8)$$

Where
N = an integer
ftpi = flux transitions per inch
TW = track width of the read head For purposes of example, it is assumed that the track width is equal to 1.2 mils, with a recording density of 5,000 flux transitions per inch. In this example, the 1.2 mil track width taken over the 200 microinch wavelength of the servo information yields an angle which is the arc tangent of N×6. As N becomes larger due to the interference created by multiple wavelengths of the data beneath the servo read head, or by the multiple wavelengths of the servo information under the data read head, the actual precision of the angle becomes less and less critical. It is, therefore, more beneficial to use a larger azimuthal misalignment of the servo information read/write heads with respect to the data read/write heads.

Not only does the invention described herein comprise a significant improvement over the prior art in writing a plurality of servo tracks onto a magnetic medium with a high degree of accuracy and at a high level of track density, but it also overcomes other long existent problems in the industry by (1) providing a means for writing the plurality of servo tracks onto the magnetic medium in a single pass of the magnetic medium in proximity to the write head; (2) providing for accurate alignment of the tracks with respect to one another and with respect to the edges of the magnetic medium throughout the entire track length; (3) optionally securing the heads for writing the tracks on the magnetic medium within a single housing; (4) permitting accurate multiple discrete track formatting; (5) providing for the writing of patterns within the designated tracks at selected angles so as to permit rapid recovery of data or servo information independently from the undesired patterns in the magnetic medium; and (6) providing a low cost and efficient method for manufacturing such a multiple track writing system. The writing head of the present invention not only overcomes the problems indicated above, but may be used in a variety of applications wherein multiple tracks are to be written on magnetic media, whether it be magnetic tape, magnetic stripes such as are used on credit cards, or the like.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced with their scope.

What is claimed and desired to be secured by United States Letters Patent is:

1. A head assembly for writing information in a plurality of tracks on a magnetic medium comprising:
   a support base;
   a first transducer connected to the support base, said first transducer having a write face of a first selected width for writing a first servo signal along said magnetic medium so as to define a first track in said magnetic medium, said first track substantially corresponding in width to said first selected width; and
   a second transducer connected to the support base spaced apart from the first transducer, said second transducer having a write face defining a plurality of alternating contact and noncontact portions, each said contact portion defining a selected write surface width which is less than said first selected width, with said second transducer configured on said support base such that at least one of said contact portions overwrites a second servo signal along said magnetic medium so as to define a second track in said magnetic medium, and to thereby form a plurality of servo tracks, said second track substantially corresponding in width to said second selected write surface width and lying within the width of said first track in said magnetic medium.

2. A head assembly as defined in claim 1, wherein the write face width of the first transducer is equal to or less than width of a recording surface of the magnetic medium.

3. A head assembly as defined in claim 1, wherein the write surface width of the contact portions are each substantially equal.

4. A head assembly as defined in claim 3, wherein the noncontact portions comprise gaps separating the contact portions, and wherein said gaps each define a width which is substantially equal to the width of the contact portions.

5. A head assembly as defined in claim 1, wherein the gaps define a depth from the write surface of the contact portion to a write face surface of the noncontact portion such that the second signal from the second transducer is not written by the noncontact portion into the magnetic medium.

6. A head assembly as defined in claim 1, wherein the magnetic medium comprises magnetic tape.

7. A head assembly as defined in claim 6, wherein the magnetic tape comprises at least a first layer of magnetic material at a first level of coercivity and a second layer of magnetic material at a second level of coercivity.

8. A head assembly as defined in claim 1, wherein the first and second transducers are secured by the support base in fixed physical relationship with respect to each other.

9. A head assembly as defined in claim 8, wherein the support base secures the first and second transducers in tandem configuration with respect to direction of travel of the magnetic medium as it passes adjacent said transducers.

10. A head assembly as defined in claim 8, wherein the first and second transducers are each configured at a selected non-orthogonal angle with respect to direction of travel of the magnetic medium as it passes adjacent said transducers.

11. A head assembly as defined in claim 1, wherein said plurality of contact portions each write said second signal along said magnetic medium, thereby placing said plurality of tracks in parallel configuration on the magnetic medium.

12. A head assembly as defined in claim 11, wherein the first signal is at a first frequency and the second signal is at a second frequency, whereby the first and second transducers place said plurality of parallel tracks in the magnetic medium in an arrangement such that signals defining alternate tracks are at separate frequencies.

13. A head assembly for writing servo signals onto a magnetic medium to define a plurality of tracks therein, comprising:
a full width write transducer positioned adjacent the magnetic medium for writing a first servo signal onto at least a portion of the magnetic medium along a first track; and
a multi-track write transducer positioned in proximity to the first transducer for overwriting a second servo signal onto portions of the magnetic medium after the first signal is written thereon to define a plurality of servo tracks within the first track.

14. A head assembly as defined in claim 13, further comprising a support structure which is connected to the first and second transducers to maintain said transducers in fixed physical relationship with respect to each other.

15. A head assembly as defined in claim 14, wherein the support base secures the first and second transducers in tandem configuration with respect to direction of travel of the magnetic medium as it passes adjacent said transducers.

16. A head assembly as defined in claim 13, wherein the first and second transducers at a selected non-orthogonal angle with respect to direction of travel of the magnetic medium as it passes adjacent said transducers.

17. A head assembly as defined in claim 13, wherein the first signal is at a first frequency and the second signal is at a second frequency, whereby the first and second transducers place said plurality of parallel tracks in the magnetic medium in an arrangement such that signals defining alternate tracks are at separate frequencies.

18. A head assembly for writing servo signals onto a magnetic medium to define a plurality of tracks therein, comprising:
first means for writing a first servo signal onto at least a portion of the magnetic medium, along a first track; and
second means positioned in proximity to the first means for overwriting a second servo signal onto portions of the magnetic medium after the first signal is written thereon, to define a plurality of tracks within the first track.

19. A head assembly as defined in claim 18, further comprising means for securing the first and second means in fixed physical relationship with respect to each other.

20. A head assembly as defined in claim 19, wherein the means for securing maintains the first and second means in tandem configuration with respect to direction of travel of the magnetic medium as it passes adjacent said first and second means.

21. A head assembly as defined in claim 19, wherein the first and second means are each configured in a skewed configuration at a selected angle with respect to direction of travel of the magnetic medium as it passes adjacent said first and second means.

22. A method of writing information in a plurality of tracks on a magnetic medium comprising the steps of:
recording a first servo signal from a first transducer along the magnetic medium so as to define a first servo track in said magnetic medium, wherein the first track defines a first track width which is determined by the track width of the first transducer; and
recording a second servo signal from a second transducer along the magnetic medium so as to define a second track in said magnetic medium to thereby form a plurality of servo tracks, and wherein the second track lies within the width of the first track in the magnetic medium the second track width is determined by the track width of one of a plurality of contact portions of the second transducer; and
recording the second signal in the magnetic medium subsequent to the recording of said first track and during a single pass of said first and second transducers adjacent the magnetic medium.

23. A method of writing information as defined in claim 22, which comprises:
passing a surface of the magnetic medium adjacent said transducers such that the surface first passes adjacent the first transducer, and such that the surface next passes adjacent the second transducer.

24. A method of writing information as defined in claim 22, which comprises:
recording said signals onto the magnetic medium at a selected angle which is non-orthogonal to the direction of travel of the magnetic medium.

25. A method of writing information as defined in claim 22, which comprises:
recording said first signal at a first selected signal frequency in said first track, and
recording said second signal at a second selected signal frequency in a plurality of spaced parallel tracks in the magnetic medium, thereby forming a plurality of parallel tracks in the magnetic medium in an arrangement such that signals defining adjacent tracks are at different signal frequencies.

26. A method of writing servo signals in a plurality of tracks on a magnetic medium by means of a full width write transducer and a multiple track transducer which is positioned in proximity to the full width write transducer the method comprising the steps of:
passing a surface of the magnetic medium adjacent the full width write transducer;
writing a first servo signal through the full width write transducer onto at least a portion of the magnetic medium;
passing said surface of the magnetic medium adjacent the multiple track write transducer; and
overwriting a second signal through the multiple track transducer to define a plurality of servo tracks within the first track on the magnetic medium.

27. A method of writing signals as defined in claim 26, wherein said transducers are secured in fixed physical relationship with each other and are each configured in a skewed configuration at a selected angle with respect to direction of travel of the magnetic medium as it passes adjacent said transducers, which comprises:
recording the said first and second signals comprise recording said signals onto the magnetic medium at the selected angle with respect to direction of travel of the magnetic medium.

28. A method of writing signals as defined in claim 26, wherein the step of writing a first signal comprises:
writing said first signal at a first selected signal frequency in said first track, and
writing said second signal at a second selected signal frequency which is different than the first signal frequency in a plurality of spaced parallel tracks in the magnetic medium, thereby forming a plurality of parallel tracks in the magnetic medium in an arrangement such that signals defining adjacent tracks are at different signal frequencies.

* * * * *